(12) United States Patent
Grantz et al.

(10) Patent No.: US 7,101,085 B2
(45) Date of Patent: Sep. 5, 2006

(54) ROTATING SHAFT CONICAL FLUID DYNAMIC BEARING

(75) Inventors: Alan Lyndon Grantz, Aptos, CA (US); Robert Alan Nottingham, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 78 days.

(21) Appl. No.: 10/454,523

(22) Filed: Jun. 3, 2003

(65) Prior Publication Data

US 2003/0223660 A1 Dec. 4, 2003

Related U.S. Application Data

(60) Provisional application No. 60/385,523, filed on Jun. 3, 2002.

(51) Int. Cl.
*F16C 17/10* (2006.01)
(52) U.S. Cl. .................................................. 384/110
(58) Field of Classification Search ................ 384/110, 384/112, 108, 109, 124
See application file for complete search history.

(56) References Cited

U.S. PATENT DOCUMENTS

| | | | | |
|---|---|---|---|---|
| 5,246,294 A | 9/1993 | Pan | | 384/119 |
| 5,448,120 A | 9/1995 | Schaule et al. | | 310/90 |
| 5,559,651 A | 9/1996 | Grantz et al. | | 360/99.08 |
| 5,697,708 A | 12/1997 | Leuthold et al. | | 384/110 |
| 5,793,129 A | 8/1998 | Parsoneault et al. | | 310/42 |
| 5,980,113 A | 11/1999 | Grantz et al. | | 384/108 |
| 5,997,179 A | 12/1999 | Khan et al. | | 384/107 |
| 5,997,357 A | 12/1999 | Grantz et al. | | 439/660 |
| 6,005,748 A | 12/1999 | Heine et al. | | 360/99.08 |
| 6,019,516 A | 2/2000 | Leuthold et al. | | 384/110 |
| 6,065,877 A | 5/2000 | Leuthold et al. | | 384/278 |
| 6,069,767 A | 5/2000 | Khan et al. | | 360/99.08 |
| 6,069,768 A | 5/2000 | Heine et al. | | 360/99.08 |
| 6,118,620 A | 9/2000 | Grantz et al. | | 360/99.08 |
| 6,119,348 A | 9/2000 | Jennings et al. | | 29/898.09 |
| 6,130,802 A | 10/2000 | Rahman et al. | | 360/99.08 |
| 6,137,650 A | 10/2000 | Heine et al. | | 360/98.07 |
| 6,144,523 A | 11/2000 | Murthy et al. | | 360/99.08 |
| 6,148,501 A | 11/2000 | Grantz et al. | | 29/603.03 |
| 6,149,161 A | 11/2000 | Grantz et al. | | 277/427 |
| 6,154,339 A * | 11/2000 | Grantz et al. | | 384/110 |
| 6,181,039 B1 | 1/2001 | Kennedy et al. | | 310/90 |
| 6,267,869 B1 | 7/2001 | MacLeod et al. | | 205/668 |
| 6,280,088 B1 | 8/2001 | Leuthold et al. | | 384/110 |
| 6,292,328 B1 | 9/2001 | Rahman et al. | | 360/99.08 |
| 6,307,291 B1 | 10/2001 | Iwaki et al. | | 310/90 |
| 6,322,252 B1 | 11/2001 | Grantz et al. | | 384/124 |
| 6,371,650 B1 | 4/2002 | Goto et al. | | 384/110 |
| 6,394,654 B1 | 5/2002 | Khan et al. | | 384/114 |

FOREIGN PATENT DOCUMENTS

WO   WO 98/28550   7/1998

OTHER PUBLICATIONS

PCT Search Report dated Oct. 21, 2003; PCT/US 03/17455.

\* cited by examiner

*Primary Examiner*—Lenard A. Footland
(74) *Attorney, Agent, or Firm*—Morrison & Foerster LLP

(57) ABSTRACT

A fluid dynamic bearing design is provided featuring a rotating shaft with at least one conical bearing formed integrally thereon. The shaft is disposed through a stationary sleeve, and a fluid separates the shaft and sleeve surfaces.

10 Claims, 5 Drawing Sheets

ROTATING SHAFT CONICAL FLUID DYNAMIC BEARING

CROSS REFERENCE TO RELATED APPLICATIONS

This application claims the priority of U.S. Provisional Application No. 60/385,523, filed Jun. 3, 2002 by Grantz et al. (entitled "Rotating Shaft Conical Fluid Dynamic Bearing"), which is herein incorporated by reference.

FIELD OF THE INVENTION

The invention relates to disk drive motors in general and particularly to fluid dynamic bearings used in disk drive motors.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks. The bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. Fluid dynamic bearings spread the bearing surface over a large surface area, as opposed to a ball bearing assembly, which comprises a series of point interfaces. This is desirable because the increased bearing surface reduces wobble or run-out between the rotating and fixed members. Further, the use of fluid in the interface area imparts damping effects to the bearing, which helps to reduce non-repeat run-out. Thus, fluid dynamic bearings are an advantageous bearing system.

However, as the size, height, and power consumption of fluid dynamic bearing motors is decreased, several problems become more prominent. For one, reducing the size of the motor features, which is a preferred approach to reducing power consumption, tends to alter the geometry of the features in such a way that comprises their structural integrity. A reduction in the diameter of the shaft forces a reduction in the size of the disc clamping screw, or a reduction in wall thickness in the shaft surrounding the screw. This can result in compromises in structural integrity. For another, as the motors themselves become shorter in height, the spacing between bearing components decreases, minimizing the angular or rocking stiffness of the bearings. Also, the power consumed by the bearings, especially at low temperatures, limits the power available to other motor components. As rotational speed increases, this problem worsens.

Therefore, a need exists for a fluid dynamic bearing design that accommodates current size, height, and power consumption demands without compromising the structural integrity or functionality of the bearings and other motor components.

SUMMARY OF THE INVENTION

The invention provides a fluid dynamic bearing design featuring a rotating shaft with at least one conical bearing formed integrally thereon. The shaft is disposed through a stationary sleeve, and a fluid separates the shaft and sleeve surfaces.

BRIEF DESCRIPTION OF THE DRAWINGS

So that the manner in which the above recited embodiments of the invention are attained and can be understood in detail, a more particular description of the invention, briefly summarized above, may be had by reference t the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
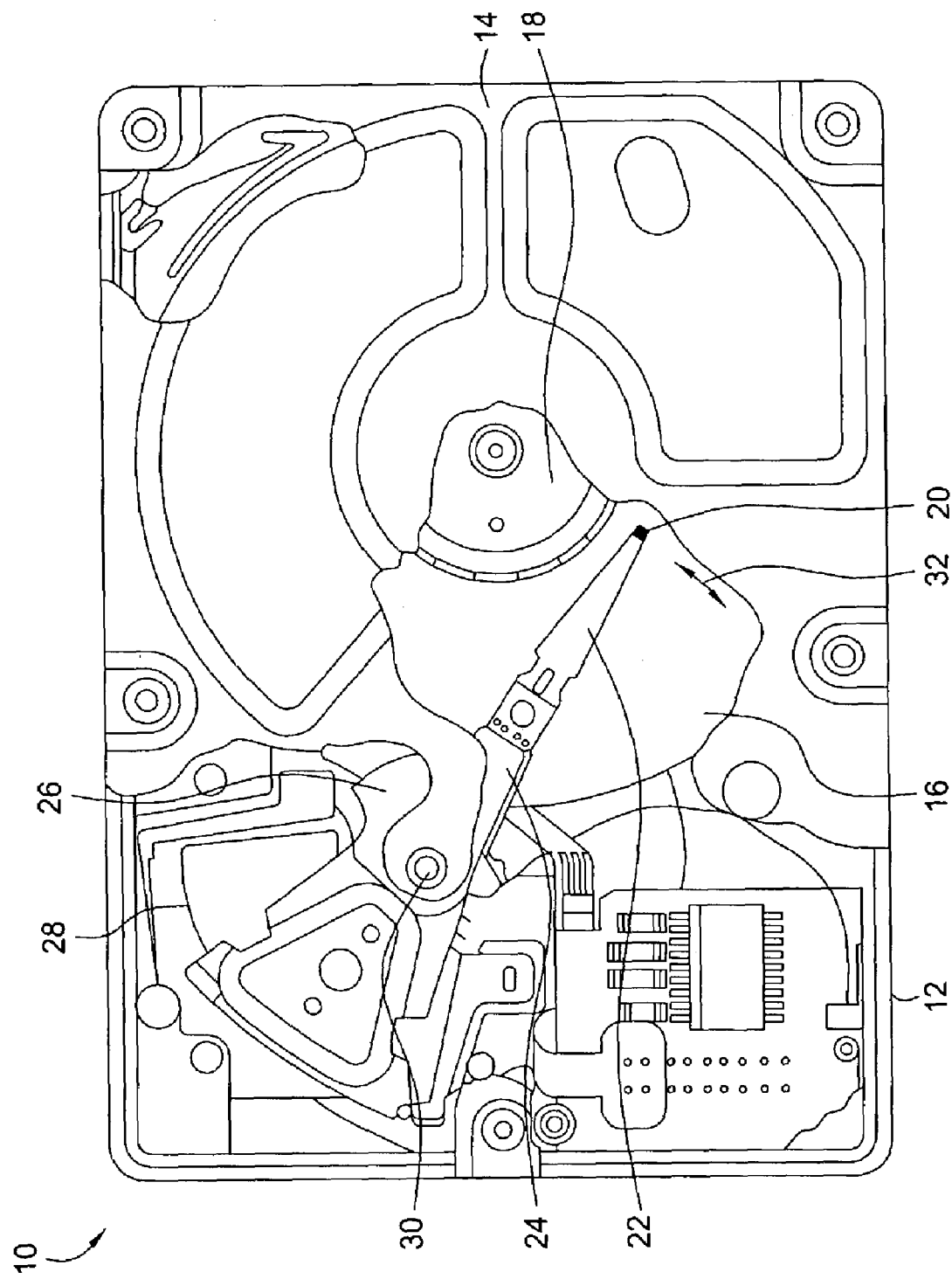
FIG. 1 depicts a plan view of one embodiment of a disk drive that comprises a motor in accordance with one embodiment of the invention.

FIG. 1 depicts a plan view of one embodiment of a disk drive 10 for use with embodiments of the invention. Referring to FIG. 1, the disk drive 10 includes a housing base 12 and a top cover 14. The housing base 12 is combined with top cover 14 to form a sealed environment to protect the internal components from contamination by elements outside the sealed environment. The base and top cover arrangement shown in FIG. 1 is well known in the industry; however, other arrangements of the housing components have frequently been used, and aspects of the invention are not limited by the particular configuration of the disk drive housing.

Disk drive 10 further includes a disk pack 16 that is mounted on a hub 204 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
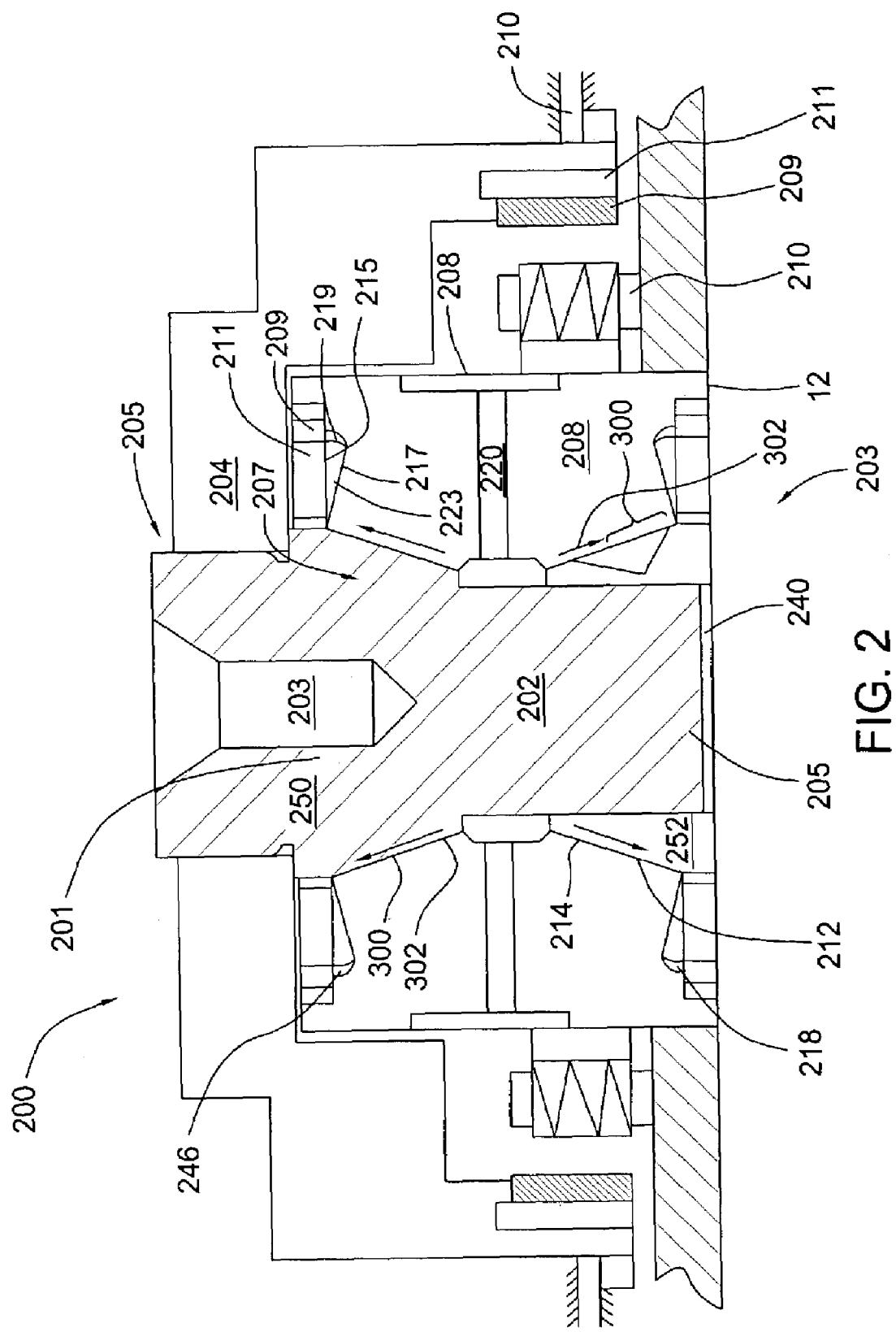
FIG. 2 depicts one embodiment of a rotating shaft conical fluid dynamic bearing motor according to the present invention.

FIG. 2 is a sectional side view of a portion of rotating shaft conical fluid dynamic bearing motor 200 according to one embodiment of the present invention. Motor 200 comprises a rotating assembly 205, a stationary assembly 203, and a bearing assembly 207.

The rotating assembly 205 comprises a shaft 202 affixed to a hub 204 that supports at least one disk 206 for rotation. The shaft 202 may further comprises an opening 203 through which a screw or the like is driven to clamp disks 206 in place (for simplicity, the disk clamp is not shown). A gap 240 between the shaft 202 and the and the base 12 allows for rotation of the shaft. The shaft end or the facing surface of the base or counterplate may have a groove pattern thereon to enhance relative rotation and prevent contact between shaft end and base. The hub 204 houses a back iron 211 with a magnet 209 affixed thereon.

The stationary assembly 203 comprises a sleeve 208, mounted on the base 12. A stator 210 mounted on the sleeve 208 cooperates with the magnet 209 in the hub 204 to induce rotation of the hub 204 and shaft 202 relative to the sleeve 208.

The bearing assembly 207 comprises a first conical region 210 integral with the shaft and a second cone 212 typically affixed to the shaft 202. The first cone 210 is formed integral with a first end 201 of the shaft 202, while the second cone 212 may be, for example, press fit onto a second end 205 of the shaft 202 for ease of assembly. Forming the first cone 210 integral with shaft 202 creates a larger diameter at the first end 201 of the shaft 202, despite an overall decreased feature size. Therefore, the overall size of the shaft 202 may be reduced in accordance with power reduction demands, but the structural integrity of the shaft 202 is not compromised as a result of including a screw thread or other opening 203 in end 201. In other words, the effective diameter of the shaft 202 is larger at the end 201 for the screw thread 203, and the mounting interface for the hub 204, than is the effective diameter for determining power loss. Furthermore, both the bending stiffness of the shaft 202 and the angular stiffness of the shaft-to-hub interface are greater in this design than in prior configurations.

A fluid 214 such as air, oil, or gas is disposed between the shaft 202 and cones 210, 212, and facing surfaces of the sleeve 208. The fluid may be introduced through the fill hole 209 in shield 211; lower surface 215 of shield 211 cooperates with facing surface 217 of sleeve 208 to define radial capillary seal 216. This seal is to maintain the fluid level in bearing 210, via reservoir 223 which stores fluid in the plenum defined between seal surfaces 215, 217. A similar radial capillary seal 218 is provided at the end of second cone 212. Vented plenum 220 separates first and second conical bearings 250, 252 and exits through the sleeve 208; it comprises a radial bore 220 extending from the central region of the shaft through the sleeve 208 to the sleeve's outer surface 209. The first and second conical bearings 250, 252 further comprise an asymmetric region of pumping grooves 302 on one of the surfaces of the cones 210, 212 or facing surface of sleeve 208. The fluid dynamic grooves help to support stable rotation of the shaft 202 and hub 204 relative to the sleeve 208, while the pumping grooves 302 (which are preferably asymmetric) pump fluid 214 toward first and second capillary seals 216, 218. Fluid dynamic grooves 302 could be formed on the surface of the sleeve 208 facing the cones 210, 212 or on the surface of the cones. Capillary seals 216, 218 function as fluid reservoirs for conical bearings 250, 252; that is, when the motor 200 is spun down, fluid 214 is returned from the capillary seals 216, 218 to the volume occupied by the pumping seals 302. Capillary seals 216, 218 are depicted in FIG. 2 as radial capillary seals, but conventional capillary seals could be used as well, although a height penalty is incurred. Pumping fluid 214 as described above eliminates the need for internal re-circulation means in cones 210, 212 (i.e. drilled pathways), so that the size of the cones 210, 212 may be reduced without compromising efficiency.

Utilizing conical bearings 250, 252 as described will maximize both journal spacing and rocking stiffness, particularly if the apexes of the fluid dynamic grooves 302 are located near the midpoints of the cones 210, 212. In addition, the reaction forces in conical bearings 210, 212 will produce a restoring moment to the shaft 202. Incorporating a crowned surface in the cone 310, 212 also is effective in locating the apex to minimize power.

Figure 3:
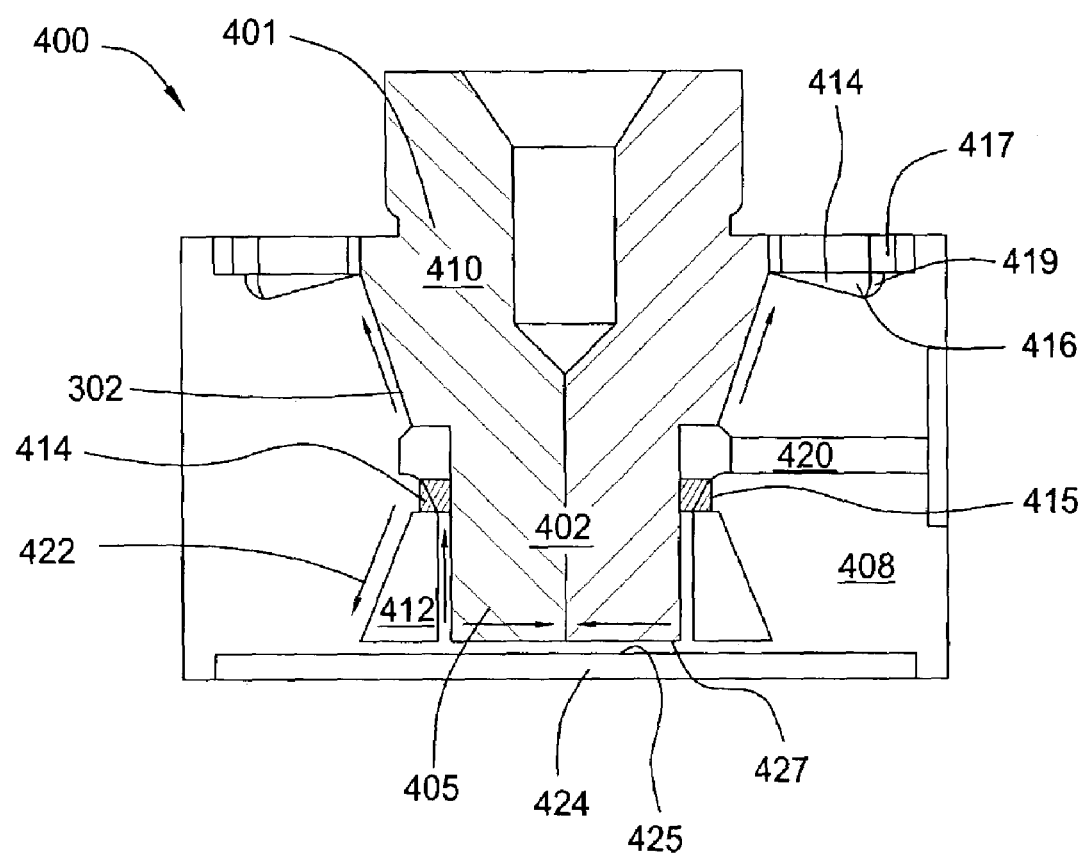
FIG. 3 depicts a second embodiment of a rotating shaft conical fluid dynamic bearing motor according to the present invention.

An alternate embodiment of the rotating shaft conical fluid dynamic bearing motor 400 is shown in FIG. 3. As in the previous embodiment, the motor 400 comprises a shaft with a first conical bearing 410 formed integrally on a first end 401 of the shaft 400, and a second conical bearing 412 affixed to a second end 405.

First conical bearing 410 is similar to that described with reference to FIG. 2, comprising asymmetric pumping grooves 302 that pump fluid 414 toward a radial capillary seal 416. First conical bearing 410 is also filled with fluid 414 by injecting a fixed amount of fluid 414 into the capillary seal 416 through fill hole 417 into plenum 419.

Second conical bearing 412 comprises an asymmetric groove pattern 302 on one of the surfaces of the cone surface or facing sleeve surface to circulate fluid 414 around the bearing 412. Fluid 414 follows a circulation path indicated by arrows 422 (downward over the outer surface of the cone and upward through the return circulation holes 417) around the bearing 412 to purge air during initial fluid fill, as well as during operation of the motor. Second conical bearing 412 is sealed by a thin sealing disk 424 affixed to stationary sleeve 408. This disc 424 has a surface 426 which defines a narrow gap 425 with the base surface 427 of shaft 402. One of the facing surfaces 426, 427 preferably has a groove pattern thereon which pumps toward the center of the shaft. This groove pattern (preferably generally spiral in form) tends to drive any air bubbles away from the gap 425 center so that they exit the system. The bearing 412 typically is filled with fluid 414 by injecting a fixed amount of fluid 414 into a vented plenum 420 that separates the first and second conical bearings 410, 412, filling a capillary seal defined between the shaft and the sleeve; when the bearing 412 spins up the fluid fills the bearing. When the bearing is at rest, capillary attraction is rebid on to hold the fluid within the bearing. The sharp corner 460 closest to the plenum region holds the fluid in the upper bearing 410 against the force of gravity; the lower bearing avoids loss of fluid by the presence of capillary seal 415 defined by the relatively diverging walls of the shaft and sleeve.

Figure 4:
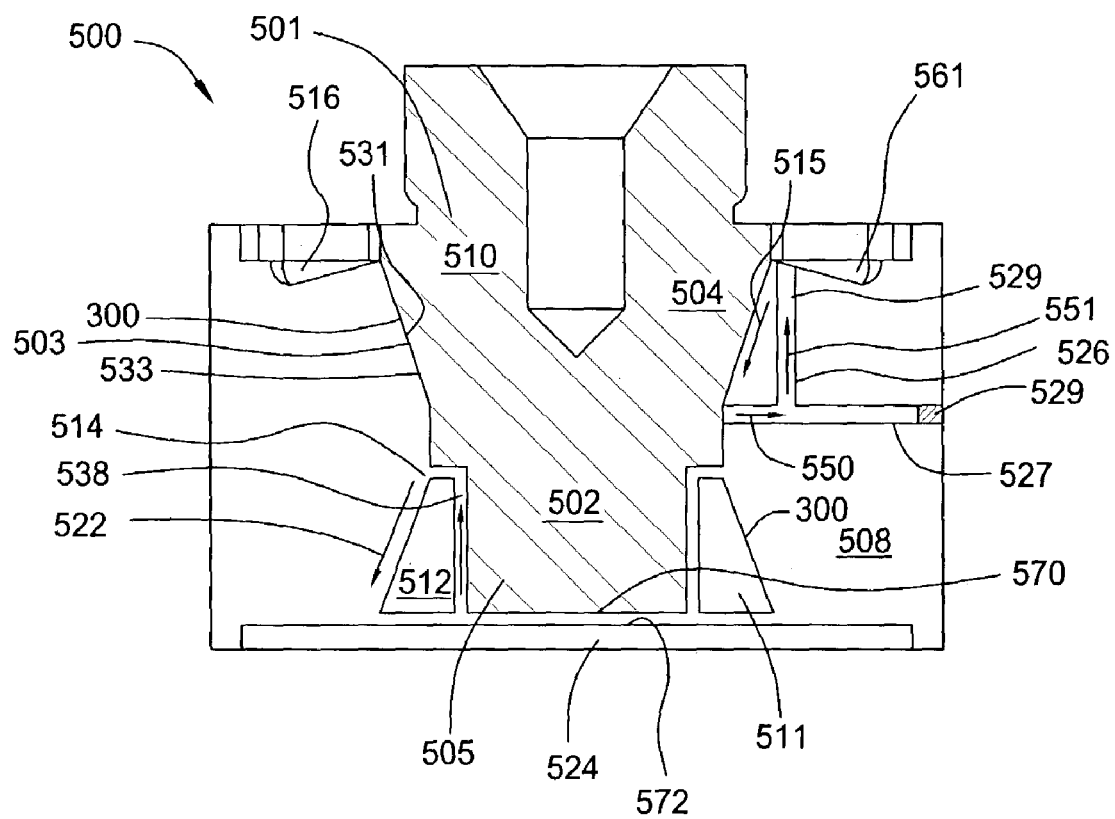
FIG. 4 depicts a third embodiment of a rotating shaft conical fluid dynamic bearing motor according to the present invention.

A third embodiment of the rotating shaft conical fluid dynamic bearing motor 500 is shown in FIG. 4. As in the previous embodiments, the shaft 502 comprises an integral first conical bearing 510 at a first end 501 defined by a cone 504 integral with the shaft, and a second conical bearing 512 defined between a cone 511 affixed to a second end 505 of the shaft 502 and a surrounding sleeve 508.

First conical bearing 510 comprises asymmetric grooves 300 on one of the facing surfaces 531, 533 of the cone and sleeve respectively which define the fluid bearing. The bearing is sealed, and supplied with fluid by a capillary seal 516 (depicted in FIG. 4 as a radial capillary seal). The grooves 300 pump fluid 514 in the direction of arrow 515 toward a first re-circulation path 526 that separates the first and second conical bearings 510, 512. The first re-circulation path 526 returns fluid 514 to the capillary seal 516 via the path indicated by arrows 550, 551 which preferably comprises in part a radial section 527 that extends across the sleeve 508, and is preferably closed off by a plug 529 that can be either removable a permanent; and further includes an axial component 529 which extends from radial component 527 to radial capillary seal 516. The pressure gradients in the fluid 514 force bubbles out the re-circulation path 526 and into the capillary seal 516 and specifically the reservoir region 561 thereof.

Second conical bearing 512 is sealed by a sealing disk 524 affixed to the stationary sleeve 508. Second conical bearing 512 comprises asymmetric grooves 300 that re-circulate fluid 514 around the bearing surface via a second re-circulation path indicated by arrows 522 including flow passages 563 interior to the cone. Therefore, the design accomplishes full fluid re-circulation around both bearings 510, 512. Also, a pattern may be defined on the bottom surface 570 of shaft 502 or the facing surface 572 of sealing disc (counterplate) 524. Such groove pattern (typically a spiral) is defined to pump toward the center of the shaft; air bubbles in the fluid will tend to move toward the outside and then cancel away through external path 527, 526. In this design, neither the top bearing 510 nor the bottom bearing 512 nor the bottom bearing 512 is isolated in terms of fluid circulation, so that air bubbles entrained in the fluid may be carried away through recirculation path 526, 527.

Figure 5:
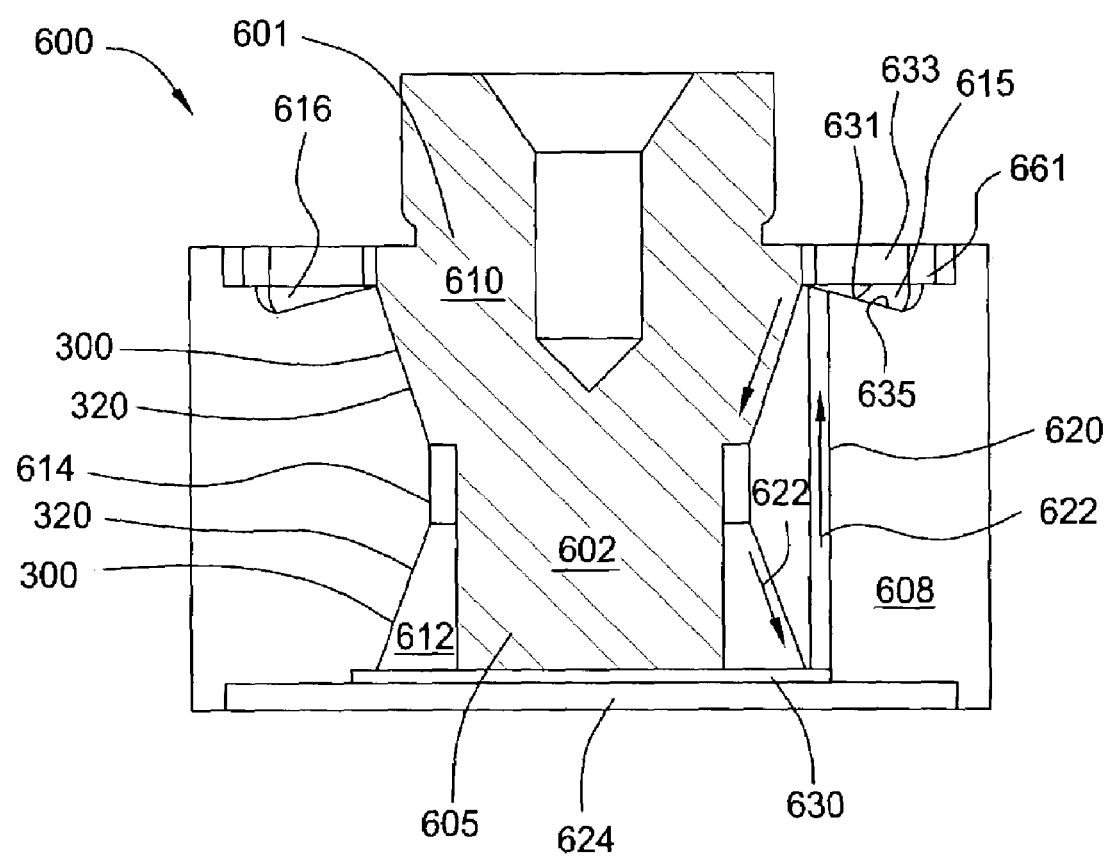
FIG. 5 depicts a fourth embodiment of a rotating shaft conical fluid dynamic bearing motor according to the present invention.

A fourth embodiment of the rotating shaft conical fluid dynamic bearing motor 600 is shown in FIG. 5. As in the previous embodiments, the shaft 602 comprises an integral first conical bearing 610 at a first-end 601, and a second conical bearing 612 is affixed to a second end 605 of the shaft 602.

First conical bearing 610 is sealed and supplied with fluid by a capillary seal 616 (depicted in FIG. 5 as a radial capillary seal). Second conical bearing 612 is sealed by a sealing disk 624 affixed to the stationary sleeve 608. Both first conical bearing 610 and second conical bearing 612 comprise asymmetric grooves 300 that are grooved to pump fluid 614 toward the bottom of the second conical bearing 612, where it enters a thin plenum region 630. From the plenum 630, fluid 614 is forced into a axial fluid re-circulation path 620 that returns fluid 614 to the reservoir region 615 the radial capillary seal 616. The radial capillary seal is defined by a lower surface 631 of shield 633 which is supported from sleeve 608 and relatively angled surface 635 of sleeve 608. The shield 633 defines a very small annular gap 641 (preferably about 0.02 mm) with shaft 602; this gap serves as a seal to prevent fluid loss from the bearing 610. The vent and fill hole 661 allows for fluid to be inserted in the capillary seal reservoir region 615, from which the fluid can be used to fill and maintain fluid in both bearings 610 and 612. The asymmetric groove patterns in bearings 610, 612 which both pump from the reservoir 615 through the bearing gaps of bearings 610, 612 toward plenum 630 and returning through recirculation path 620 to reservoir 615. The circulation of the fluid 614 is indicated by arrows 622. The pressure gradients in the fluid 614 force bubbles out the re-circulation path 620 and into the capillary seal 616, purging air from the motor 600.

Therefore, the present invention represents a significant advancement in the field of conical fluid dynamic bearing motors. Structural integrity is enhanced over prior designs, while .feature size remains small so that the motor consumes substantially the same amount of power.

In summary, the reduction in feature size is accomplished by making the top cone integral with the shaft. This allows the screw thread for the disc clamp to be placed within the larger diameter of the top cone. The effective diameter of the shaft is therefore larger for the disc clamp screw, and the mounting interface for the hub, than is the effective diameter for determining power loss. As a herringbone grooving pattern is often used in conical bearings, and the apex of the grooves is near the midpoint of the cones, the effective diameter for determining power consumption is the midpoint of the cone. Incorporating a crown in the conical bearing also helps to insure the apex diameter is the effective diameter for determining power.

Utilizing a conical structure with the apex of the grooving pattern near the midpoint of the cones, maximizes journal spacing and maximizes rocking stiffness. The thrustplate in a single plate motor utilizes space on one end of the shaft that is not available for grooving. In a conical motor, the axial and radial bearings are combined and share the same center. In addition, it will be observed that the vectors representing the reaction forces in the two conical bearings produce a restoring moment to the shaft. These vectors are normal to the conical surface. The restoring moment is determined by multiplying the magnitude of these vectors by the length of a line drawn between the bearing center (midpoint between the bearings on the shaft centerline) and the normal to the force vector. This line is parallel to the cone angle, and is longer than the axial distance between the bearing midpoint and a horizontal line intersecting the groove apex.

The narrow waist of the cone and the shaft is smaller than the diameter that a straight shaft would have to have with the same disc clamping screw. This, in addition to the effective cone diameter discussed results in a reduction in power over a single plate design with the same stiffness performance. Note that the bending stiffness of the shaft, and the angular stiffness of the shaft to hub interface are greater in the rotating shaft design due to the tapered design of the top of the shaft. Material is added where it benefits stiffness and strength the most—at the attachment end of the cantilevered shaft.

While the foregoing is directed to embodiments of the invention, other and further embodiments of the invention may be devised without departing from the basic scope thereof, and the scope thereof is determined by the claims that follow.

What is claimed is:

1. A fluid dynamic bearing system for a disk drive motor comprising:
    a rotatable shaft;
    a first conical bearing including a conical region formed integral with a first end of the shaft;
    a second conical bearing including a cone affixed to a second end of the shaft;

a stationary sleeve disposed around the shaft;

a gap defined between an end surface of the shaft adjacent the second conical bearing and a facing surface of a counterplate supported from the sleeve; and a common fluid disposed between the first conical bearing and the stationary sleeve, and the second conical bearing and the stationary sleeve.

2. A fluid dynamic bearing system as claimed in claim 1 further comprising a radial capillary seal adjacent an outer end of at least one of the first and second conical bearings.

3. The fluid dynamic bearing system according to claim 2, wherein the radial capillary seal defines a fluid reservoir.

4. A fluid dynamic bearing system as claimed in claim 1 further comprising a vent and fill hole defined intermediate the first and second conical bearings.

5. A fluid dynamic bearing system as claimed in claim 4 wherein the vent comprises a radial bore extending from the central region of the shaft through the sleeve to the outer diameter of the sleeve.

6. A fluid dynamic bearing system as claimed in claim 1 further comprising one or more fluid return paths interior to the cone of the second conical bearing from a wider end of the cone toward a narrower end of the cone and the center region of the shaft.

7. The fluid dynamic bearing system of claim 1 further comprising an axially oriented fluid recirculation path extending from a vent to a radial capillary seal adjacent a wider end of the first conical bearing.

8. A fluid dynamic bearing system as claimed in claim 1 further comprising grooves defined on a surface of each of the first and second conical bearings, each of the grooves being asymmetric to pump the fluid toward an end of the shaft adjacent the second conical bearing.

9. A fluid dynamic bearing as claimed in claim 1 further comprising a radial capillary seal supported adjacent a wider end of the first conical bearing.

10. A fluid dynamic bearing system as claimed in claim 9 further comprising an axial bore extending from a plenum adjacent a wider end of the second conical bearing to a fluid reservoir region in the radial capillary seal to allow for recirculation of the common fluid over the first and second conical bearings.

* * * * *